United States Patent
Hosotani et al.

(10) Patent No.: US 6,927,556 B2
(45) Date of Patent: Aug. 9, 2005

(54) SWITCHING POWER SUPPLY APPARATUS

(75) Inventors: Tatsuya Hosotani, Muko (JP); Takanori Koyama, Kyotanabe (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/794,062

(22) Filed: Mar. 8, 2004

(65) Prior Publication Data

US 2004/0227496 A1 Nov. 18, 2004

(30) Foreign Application Priority Data

May 16, 2003 (JP) ........................................ 2003-139122

(51) Int. Cl.[7] ........................... G05F 1/656; G05F 1/652
(52) U.S. Cl. ........................ 323/222; 323/224; 323/284
(58) Field of Search ................................. 323/222, 224, 323/282, 284, 223

(56) References Cited

U.S. PATENT DOCUMENTS

| | | | | |
|---|---|---|---|---|
| 6,507,174 B1 | * | 1/2003 | Qian | 323/222 |
| 6,512,352 B2 | * | 1/2003 | Qian | 323/282 |
| 6,661,684 B2 | * | 12/2003 | Morita | 363/89 |
| 6,690,143 B2 | * | 2/2004 | Lin et al. | 323/222 |

FOREIGN PATENT DOCUMENTS

WO    WO 95/22092    8/1995

OTHER PUBLICATIONS

Yungtaek Jang et al., "Design Considerations and Performance Evaluation of a 3–kW, Soft–Switched Boost Converter with Active Snubber", 1998 IEEE, pp. 678–684.

* cited by examiner

*Primary Examiner*—Bao Q. Vu
(74) *Attorney, Agent, or Firm*—Keating & Bennett, LLP

(57) ABSTRACT

A switching power supply apparatus includes a first commutation inductor which is provided in a path of current flowing from a power supply input unit through a first switching circuit and an inductor during an ON period of a first switching circuit, and a second commutation inductor provided in a path of current flowing through the inductor during an OFF period of the first switching circuit. The first and second commutation inductors and the inductor are connected to a first junction point. One end of a clamping series circuit, which includes a second switching circuit and a series capacitor connected in series, is connected to a second junction point, which connects the first commutation inductor and the first switching circuit, and the other end thereof is connected so that the first and second commutation inductors and the series capacitor constitute a resonance circuit. Accordingly, first and second switching elements can be turned on at a zero voltage.

11 Claims, 12 Drawing Sheets

SWITCHING POWER SUPPLY APPARATUS

BACKGROUND OF THE INVENTION

1. Field of the Invention

The present invention relates to a switching power supply apparatus for supplying and interrupting power from an input power supply and converting the power by using an inductor so as to output a predetermined DC voltage.

2. Description of the Related Art

U.S. Pat. No. 5,736,842 (Patent Document 1) and International Publication No. 95/22092 pamphlet (Patent Document 2) disclose switching power supply apparatuses for reducing loss, in which a switching element is switched when the applied voltage thereto is almost zero.

FIG. 11 is a circuit diagram of the switching power supply apparatus according to Patent Document 1. In this apparatus, a series circuit (clamping circuit) including a switching element S1 and a capacitor CC is connected to a junction point of an inductor LS and a switching element S and is connected to a junction point of a diode D and a smoothing capacitor CF. Also, the clamping circuit is connected in parallel to a series circuit including the inductor LS and the diode D.

In the switching power supply apparatus shown in FIG. 11, energy is accumulated in the inductor LS during an ON period, when the switching element S is conducting, the capacitor CC is charged during an OFF period of the switching element S, and then discharge is performed. By turning off the switching element S1 during the discharge period, electric charge accumulated across the parasitic capacitance of the switching element S is discharged, so that the switching element is turned on such that the voltage across the switching element is zero (hereinafter, this operation is referred to as zero-voltage switching).

FIG. 12 is a circuit diagram of the switching power supply apparatus according to Patent Document 2. In this circuit, an inductor L2 is connected between a junction point of the inductor L2 and a switching element S1 and a fifth diode D5. With this configuration, a series circuit (clamping circuit) including a switching element S2 and a capacitor C3 is connected across the inductor L2 and energy is accumulated in the inductor L2 during an OFF period of the switching element S1, so as to perform zero-voltage switching of the switching element S1.

In the switching power supply apparatus shown in FIG. 11 according to Patent Document 1, commutating energy accumulated in the inductor LS changes when an input voltage and an output current significantly vary, and thus zero-voltage switching is difficult to perform in a wide range of input voltage and load current. In particular, in a switching power supply apparatus having a harmonic current regulating function, switching is performed without rectifying/smoothing a DC input power supply voltage, and thus the input voltage significantly varies. For example, when a commercial AC power supply voltage is AC 264 V, the input voltage changes in a wide range of 0 to 373 V at the commercial AC power supply frequency. Therefore, loss is significantly increased when zero-voltage switching is not performed reliably.

Also, a peak current and an effective current flowing through the inductor LS significantly change with a change in the input power supply voltage. Therefore, it is difficult to accumulate a commutating energy required for zero-voltage switching while decreasing conduction loss by the inductor LS.

Further, when the junction point of the inductor LS and the switching element S and a stable potential (for example, potential across the smoothing capacitor CF) are connected by the clamping circuit, current flows through the inductor L continuously under a light-load condition, so that a current regenerative mode occurs, where current is regenerated in the input. Accordingly, conduction loss by the inductor L and the switching element S increases and efficiency under a light-load condition is significantly deteriorated.

In the switching power supply apparatus shown in FIG. 12 according to Patent Document 2, when an input power supply voltage and an output current to a load significantly vary, commutating energy accumulated in the inductor L2 changes. Therefore, it is difficult to perform zero-voltage switching in a wide range of input power supply voltage and output current. Also, it is difficult to accumulate a commutating energy required for zero-voltage switching while reducing conduction loss by the inductor L2.

SUMMARY OF THE INVENTION

In order to overcome the problems described above, preferred embodiments of the present invention provide a low-loss switching power supply apparatus for reliably performing zero-voltage switching regardless of a wide range of change in one of an input power supply voltage and output current.

In addition, preferred embodiments of the present invention provide a switching power supply apparatus in which a power factor is significantly improved by performing zero-voltage switching regardless of a wide range of change in an input power supply voltage.

A switching power supply apparatus according to a preferred embodiment of the present invention includes a first switching circuit for supplying and interrupting power from a power supply input unit, an inductor for accumulating the power input through the first switching circuit and discharging the power to a power supply output unit, a rectifier diode for rectifying a current flowing to the output unit, and a smoothing capacitor for smoothing a voltage of the output unit. A first commutation inductor is provided in a path of current flowing from the power supply input unit through the first switching circuit and the inductor during an ON period of the first switching circuit. A second commutation inductor is provided in a path of current flowing through the inductor during an OFF period of the first switching circuit. The inductor and the first and second commutation inductors are connected to a first junction point. A clamping series circuit including a second switching circuit and a series capacitor connected in series is provided, and one end of the clamping series circuit is connected to a second junction point, which connects the first commutation inductor and the first switching circuit, so that the first and second commutation inductors and the series capacitor constitute a resonance circuit. The first switching circuit includes a parallel circuit of a first switching element, a first diode, and a first capacitor. The second switching circuit includes a parallel circuit of a second switching element, a second diode, and a second capacitor. Also, a switching control circuit for alternately turning on/off the first and second switching elements with a period when both switching elements are off therebetween is provided.

With this configuration, energy is accumulated in the first and second commutation inductors during the ON and OFF periods of the first and second switching circuits, so that zero-voltage switching can be realized. Further, even if one of an input power supply voltage and an output current significantly varies, zero-voltage switching can be performed and a switching loss can be significantly reduced.

Preferably, the clamping series circuit may be connected in parallel to a series circuit of the first and second commutation inductors.

With this unique configuration, when the load to the output is light and when a current flowing through the first and second commutation inductors is small, the apparatus operates in a so-called current discontinuous mode, where a current flows through the series inductor discontinuously, so that conduction loss due to a regenerative current can be reduced.

Also, one end of the clamping series circuit including the second switching circuit and the series capacitor connected in series may be connected to the second junction point, and the other end of the clamping series circuit may be connected to any of the power supply input unit, the power supply output unit, and the ground.

With this configuration, when the load to the output is light, the apparatus operates in a regenerative mode, where power is supplied to the power supply input unit through the series inductor, so that a predetermined current continues to flow through the series inductor. Accordingly, stability of the output voltage and the response characteristic of the switching power supply apparatus under a light-load condition are greatly improved.

The first and second commutation inductors may be magnetically coupled.

Accordingly, the total inductance of the first and second commutation inductors becomes larger than a case where the first and second commutation inductors are arranged independently. Also, the number of turns of a wire on a core can be reduced, so that the inductors can be miniaturized and conduction loss caused by the wire can be reduced.

Also, an overcurrent protective circuit for detecting a current flowing through the second switching element, turning off the second switching element when the current reaches a predetermined value so as to suppress a peak of the current flowing through the second switching element, and suppressing magnetic saturation of the first and second commutation inductors may be connected in series with the second switching element.

With this configuration, the peak of current flowing through the second switching element can be suppressed, magnetic saturation of the first and second commutation inductors can be prevented, and breakdown of the second switching element due to overcurrent caused by magnetic saturation can be prevented.

Further, a third diode having a shorter reverse recovery time than that of the second switching element and preventing a reverse current to the second switching element may be provided in the clamping series circuit. Also, a fourth diode preferably having a shorter reverse recovery time than that of the second diode connected in parallel to the second switching element may be connected in parallel to a series circuit including the second switching circuit, in a direction opposite to a conduction direction of the second switching element.

By providing the third and fourth diodes, switching loss of the first switching element caused by a reverse recovery time of the parasitic diode of the second switching element can be reduced. Also, by providing the fourth diode, loss caused by a circuit for detecting a current flowing through the second switching element can be reduced.

A fifth diode may be connected in parallel to the series capacitor, in a direction for preventing application of a reverse voltage to the series capacitor.

With this configuration, application of a reverse voltage to the series capacitor can be prevented, and the fifth diode is short-circuited when an overvoltage is applied, so as to prevent breakdown of the series capacitor.

Further, a full-wave rectification circuit for performing full-wave rectification of input from a commercial AC power supply may be provided, and a low-pass filter for allowing frequency components of the commercial AC power supply to pass therethrough and cutting off components of switching frequencies of the first and second switching elements and their harmonic contents may be provided between the full-wave rectification circuit and the power supply input unit.

With this configuration, a pulse current generated by switching the first and second switching elements is interrupted by the low-pass filter and the pulse current is not applied to the full-wave rectification circuit. Accordingly, loss in the full-wave rectification circuit can be reduced.

The switching control circuit may include a unit for multiplying a voltage proportional or substantially proportional to a full-wave rectification voltage signal obtained by rectifying the commercial AC power supply voltage by a DC output voltage or a DC voltage obtained by dividing the output voltage so as to obtain a reference signal for a current error amplifier which controls both input current and output voltage, and controlling the pulse width of a control signal for the first and second switching elements based on the reference signal.

In this way, by controlling the input current waveform from the input power supply, harmonic current in the input current can be suppressed.

Also, at least one of the first and second switching circuits may be a field-effect transistor.

With this configuration, parasitic diode and capacitor of the field-effect transistor can be used as circuit elements, so that the number of components can be reduced and the size and weight of the apparatus can be reduced.

The switching control circuit may include a timing control unit for turning on the first or second switching element after a voltage applied across the first or second switching element drops to zero or nearly zero.

In this way, by performing zero-voltage switching of the -first and second switching elements, switching loss can be significantly reduced, switching surge can be suppressed, and thus efficiency of the switching power supply apparatus can be increased and also the size and weight of the apparatus can be reduced.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1:
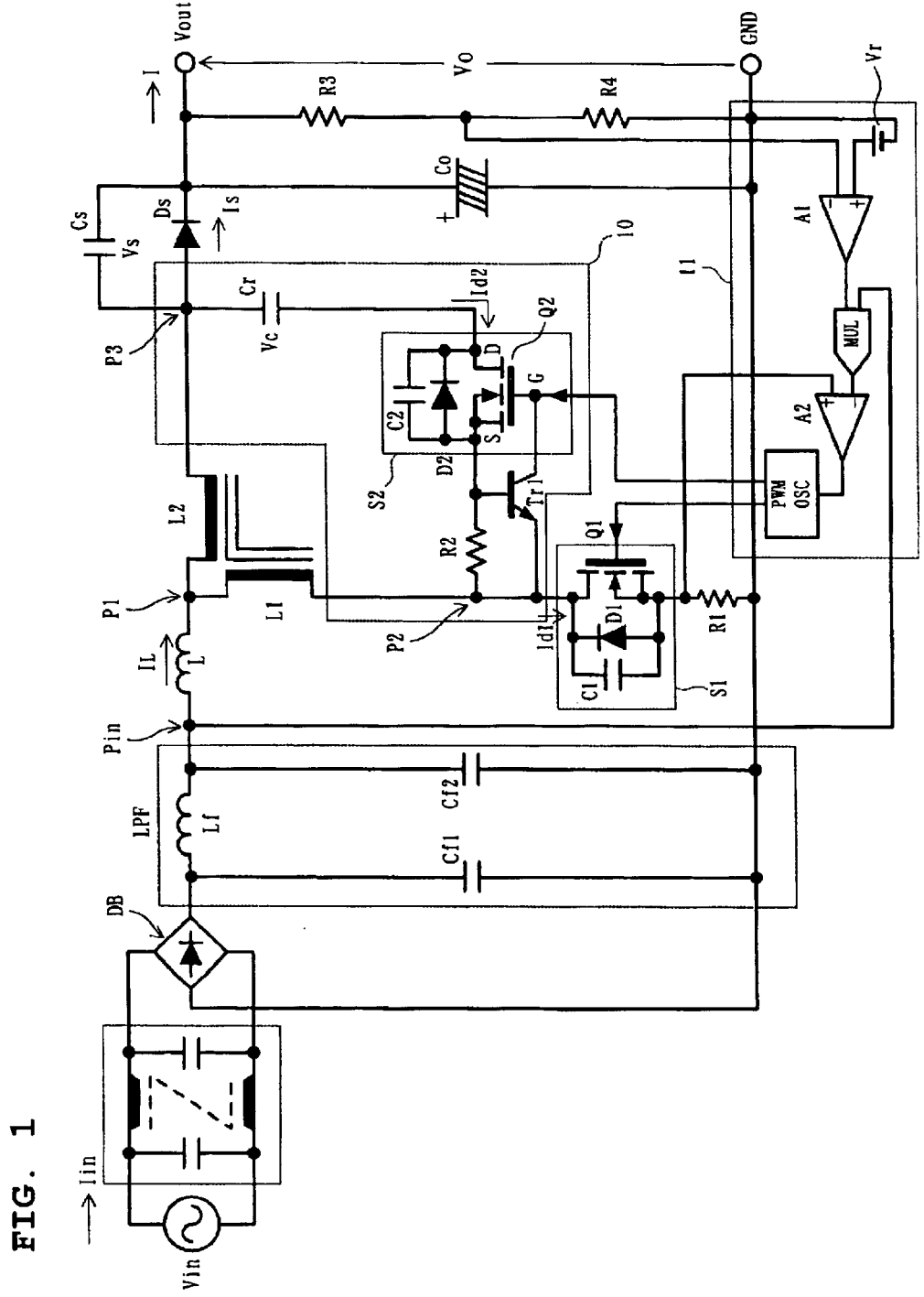
FIG. 1 is a circuit diagram of a switching power supply apparatus according to a first preferred embodiment of the present invention.
Figure 2:
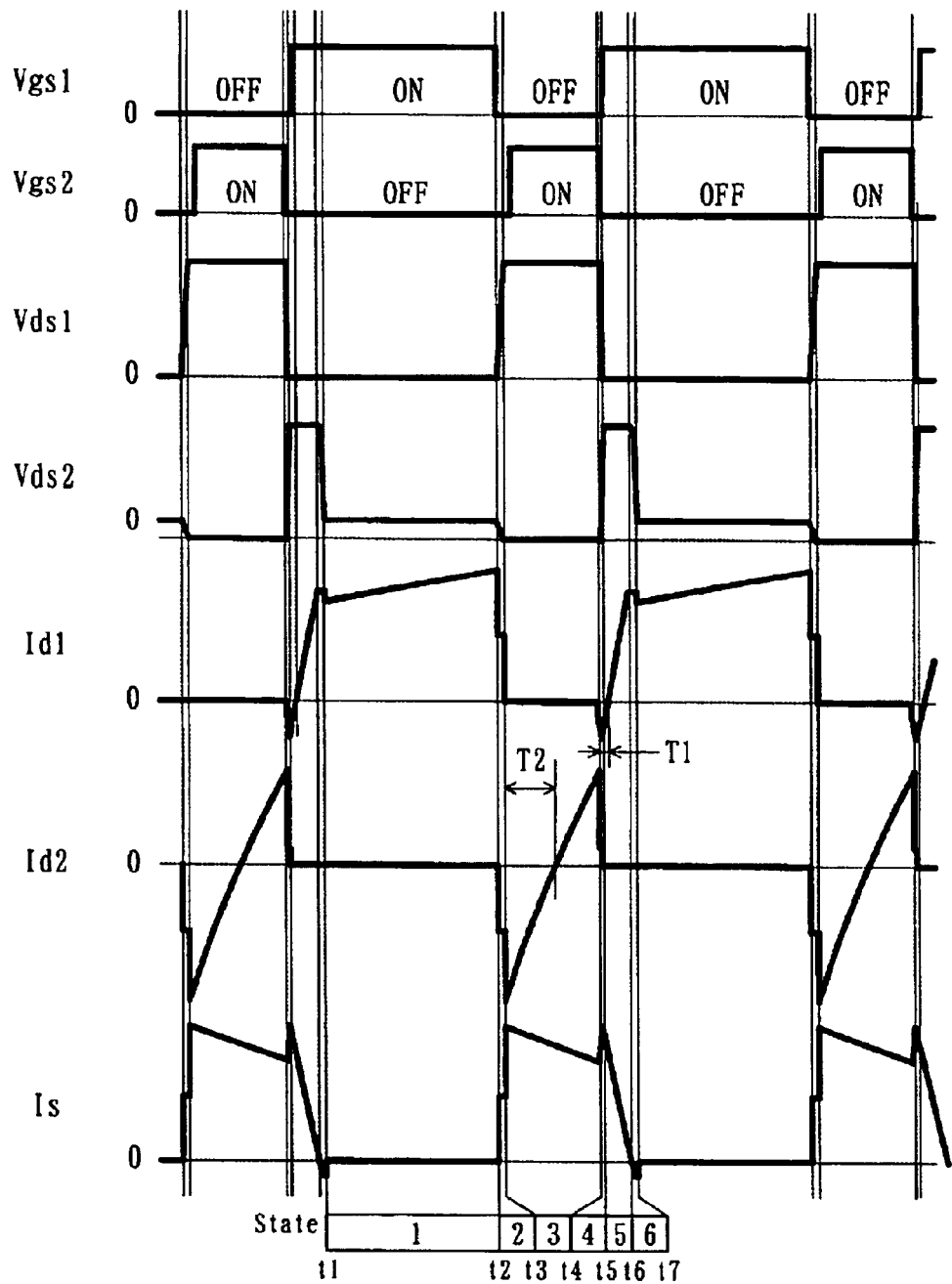
FIG. 2 shows waveforms in components of the circuit of FIG. 1.
Figure 3:
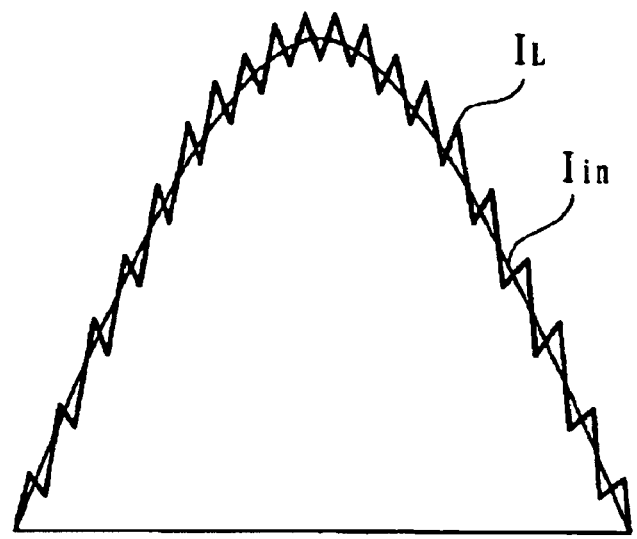
FIG. 3 shows waveforms of an input current Iin and a current IL flowing through an inductor L.

Hereinafter, a switching power supply apparatus according to a first preferred embodiment will be described with reference to FIGS. 1 to 3. FIG. 1 is a circuit diagram of the switching power supply apparatus, and FIGS. 2 and 3 show waveforms in components thereof.

In FIG. 1, the circuit includes a commercial AC power supply Vin and a diode bridge DB for performing full-wave rectification of the current. A low-pass filter LPF allows frequencies (about 50 Hz to about 60 Hz) of the commercial AC power supply to pass therethrough and cuts off a switching frequency (for example, around 100 kHz). The low-pass filter LPF includes an inductor Lf and capacitors Cf1 and Cf2. An inductor L is a power-converting inductor and inductors L1 and L2 are first and second commutation inductors. A first switching circuit S1 includes a parallel circuit of a first switching element Q1, a first diode D1, and a first capacitor C1. By using a MOSFET as the first switching circuit S1, the parasitic diode and parasitic capacitor thereof can be used as the first diode D1 and the first capacitor C1, respectively. The first commutation inductor L1 is provided in a path of current flowing from a power supply input unit Pin through the first switching circuit S1 and the inductor L during an ON period of the first switching circuit S1.

The second commutation inductor L2 is provided in a path of current flowing through the inductor L during an OFF period of the first switching circuit S1. Also, the inductor L and the first and second commutation inductors L1 and L2 are connected to a first junction point P1.

An output unit of the circuit includes a rectifier diode Ds and a smoothing capacitor Co for smoothing a voltage at the output unit. A capacitor Cs is a parasitic capacitor of the rectifier diode Ds.

A second switching circuit S2 includes a parallel circuit of a second switching element Q2, a second diode D2, and a second capacitor C2. As in the first switching circuit S1, by using a MOSFET as the second switching circuit S2, the parasitic diode and parasitic capacitor thereof can be used as the second diode D2 and the second capacitor C2, respectively. The second switching circuit S2 is connected in series to a series capacitor Cr, and this series circuit functions as and defines a clamping series circuit 10.

One end of the clamping series circuit 10 is connected to a second junction point P2, which connects the first commutation inductor L1 and the first switching circuit S1, and the other end of the clamping series circuit 10 is connected to a third junction point P3, which connects the second commutation inductor L2 and the rectifier diode Ds, so that the first and second commutation inductors L1 and L2 and the series capacitor Cr constitute a resonance circuit. Also, in this preferred embodiment, the clamping series circuit 10 is connected in parallel to a series circuit of the first and second commutation inductors L1 and L2.

The first and second commutation inductors L1 and L2 are preferably formed by winding wires on a core, and both inductors are magnetically coupled. Generally, the inductance of an inductor is proportional to the square of the number of turns of a wire. For example, when the first and second commutation inductors L1 and L2 are preferably formed on the same core by winding wires thereon to provide 5 turns respectively, the total inductance is $(5^2)*A+(5^2)*A=50A$ when the both inductors are not magnetically coupled. On the other hand, when the both inductors are magnetically coupled, the total inductance is $((5+5)^2)*A=100A$, such that the total inductance can be doubled. Herein, A is a value generally called Al-Value (induction coefficient), which depends on the material of core, an effective cross section, the length of magnetic path, and so on. Accordingly, the same inductance can be obtained by fewer turns of wire, and thus the size and weight of the first and second commutation inductors can be reduced and conduction loss of the wires can also be reduced.

A resistor R2 for detecting a current flowing through the second switching element Q2 is connected in series to the second switching element Q2. Also, a transistor Tr1 is connected to the second switching element Q2 so that a voltage dropped by the resistor R2 is applied between the base and emitter and that the gate-source of the second switching element Q2 is short-circuited by conduction between the collector and emitter.

Resistors R3 and R4 constitute a resistance voltage divider for dividing an output current Vo at a certain ratio. A resistor R1 extracts a current Id1 flowing through the first switching circuit S1 as a voltage signal.

In a switching control circuit 11, a voltage error amplifier A1 compares voltage divided by the resistors R3 and R4 in the resistance voltage divider with a reference voltage Vr, so as to output a DC voltage signal. A multiplier MUL multiplies the output from the voltage error amplifier A1 and a full-wave rectification voltage signal from the power supply input unit Pin so as to output a signal having a full-wave rectification voltage waveform. A current error amplifier A2 uses an output voltage of the multiplier MUL as a reference signal and performs error amplification of this reference signal and a dropped voltage signal of the resistor R1 (that is, a voltage signal proportional to the current Id1 flowing through the first switching circuit S1), and applies the signal to a pulse width modulation oscillator PWMOSC. The PWMOSC applies a switching control signal to the gates of the first and second switching elements Q1 and Q2 in accordance with the output voltage of the current error amplifier A2. The PWMOSC controls an ON-time ratio (time ratio) of the first switching element Q1 in a switching cycle. At this time, the first and second switching elements Q1 and Q2 are alternately turned on/off with a period when both elements are OFF therebetween, as described later.

FIG. 2 shows waveforms in the components shown in FIG. 1. Herein, Vgs1 is a gate-source voltage of the first switching element Q1 and Vgs2 is a gate-source voltage of the second switching element Q2. Vds1 is a drain-source voltage of the first switching element Q1 and Vds2 is a drain-source voltage of the second switching element Q2. Id1 is a drain current of the first switching element Q1 and Id2 is a drain current of the second switching element Q2. Is is a current flowing through the rectifier diode Ds. The operation of the circuit in each state will be described below.

State 1: t1–t2

The first switching element Q1 is in conduction, and the second switching element Q2 and the rectifier diode Ds are in an OFF state. The input voltage Vin is applied to a series circuit of the inductor L and the commutation inductor L1, so that the drain current Id1 flows through the first switching element Q1. The drain current Id1 linearly increases over time. The voltage Vc of the series capacitor Cr is applied between the drain and source of the second switching element Q2, and the output voltage Vo is applied across the rectifier diode Ds. Then, the first switching element Q1 is turned off at time t2 so as to shift to state 2.

State 2: t2–t3

When the first switching element Q1 is turned off, the first capacitor C1 is charged with the current flown through the inductor L and the commutation inductor L1 and the second capacitor C2 and the capacitor Cs are discharged. At time t2, when the drain-source voltage Vds2 of the second switching element Q2 and the voltage Vs of the rectifier diode Ds reach zero, the second diode D2 of the second switching element Q2 and the rectifier diode Ds are brought into conduction.

State 3: t3–t4

When the second diode D2 of the second switching element Q2 is brought into conduction, the voltage Vc of the series capacitor Cr is applied to the series circuit of the first and second commutation inductors L1 and L2. The series capacitor Cr has a capacitance that is large enough, the charging voltage Vc of the capacitor Cr is substantially constant, and the drain current Id2 of the second switching element Q2 increases substantially linearly over time. Herein, by turning on the second switching element Q2 before the current flowing through the second diode D2 reaches zero, zero-voltage switching of the second switching element Q2 can be performed. That is, since the drain-source voltage of the second switching element Q2 is zero while a current is flowing through the second diode D2 (during period T2 in FIG. 2), zero-voltage switching of the second switching element Q2 can be achieved by bringing Vgs2 to a high level during that period. Then, the second switching element Q2 is turned off at time t4 so as to go to state 4.

State 4: t4–t5

When the second switching element Q2 is turned off, the first capacitor C1 is discharged by the current flown through the first and second commutation inductors L1 and L2, and the second capacitor C2 is charged. Also, when the drain-source voltage Vds1 of the first switching element Q1 reaches zero, the first diode D1 of the first switching element Q1 is brought into conduction, so as to go to state 5.

State 5: t5–t6

When the first diode D1 is brought into conduction, the output voltage Vo is applied to the series circuit of the first and second commutation inductors L1 and L2. The drain current Id1 linearly increases. Herein, during a period before the drain current Id1 of the first switching element Q1 reaches zero, that is, during a period when the first diode D1 is in conduction (during period T1 in FIG. 2), Vgs1 is brought to a high level and the first switching element Q1 is turned on, so that zero-voltage switching of the first switching element Q1 can be performed. Then, at time t6, the drain current Id1 becomes equal to the current flowing through the inductor L and the current Is of the rectifier diode Ds reaches zero, so as to go to state 6, which is a reverse recovery time of the rectifier diode Ds.

State 6: t6–t7

During the reverse recovery time of the rectifier diode Ds, the voltage Vs of the rectifier diode Ds is zero and the current Is flows in a reverse direction. Then, at a transition time of the rectifier diode Ds, the voltage Vs across the rectifier diode Ds starts to increase, and at the same time, the drain-source voltage Vds2 of the second switching element Q2 decreases. Accordingly, the voltage Vc of the series capacitor Cr becomes equal to an applied voltage of the series circuit including the first and second commutation inductors L1 and L2.

The above-described states 1 to 6 are repeated.

FIG. 3 shows a relationship between an input current Iin and a current IL flowing through the inductor L shown in FIG. 1. The input current Iin is equivalent to a component obtained by filtering a current signal of the current IL flowing through the inductor L by the low-pass filter LPF shown in FIG. 1. Even if the voltage at the power supply input unit Pin significantly changes from 0 V to a peak voltage of a full-wave rectification voltage waveform, zero-voltage switching of the first and second switching elements Q1 and Q2 can be performed in a wide range, and the input current Iin has a waveform which is almost the same as that of the commercial AC power supply voltage. This is equivalent to an operation where the entire switching power supply apparatus including a load connected to its output unit functions as a resistance load to the commercial AC power supply, and it operates as a load having a power factor of about 1.0. Accordingly, the power factor can be significantly improved.

In this preferred embodiment, the first and second diodes D1 and D2 and the first and second capacitors C1 and C2 connected in parallel to the first and second switching elements Q1 and Q2, respectively, are parasitic diodes and parasitic capacitors of MOSFETs, and the capacitor Cs connected in parallel to the rectifier diode Ds is a parasitic capacitor. However, independent (non-parasitic) diodes and capacitors may be positively added in accordance with a required current-carrying capacity of each diode and a required capacitance of each capacitor.

Next, a switching power supply apparatus according to a second preferred embodiment will be described with reference to a circuit diagram shown in FIG. 4. This switching power supply apparatus is constructed by adding third to fifth diodes D3 to D5 to the switching power supply apparatus shown in FIG. 1.

In this preferred embodiment, the third diode D3 is connected to a series circuit including the second switching circuit S2 and the series capacitor Cr in a direction for preventing a reverse current to the second switching element Q2.

Also, the fourth diode D4 is connected in parallel to the series circuit including the second switching circuit S2 in a direction opposite to a conduction direction of the second switching element Q2. The fourth diode D4 bypasses a current flowing through the resistor R2 in the opposite direction so as to reduce conduction loss by the resistor R2 and so on. Also, the reverse recovery time of the fourth diode D4 is shorter than that of the second diode D2. Accordingly, the second diode D2 does not function, so that a reverse recovery current is reduced by the fourth diode D4.

The fifth diode D5 is connected in parallel to the series capacitor Cr in a direction for preventing application of a reverse voltage to the capacitor Cr. Accordingly, a capacitor component having a polarity can be used as the series capacitor Cr. Further, by using a Zener diode as the fifth diode D5, when a voltage surpassing a Zener voltage is applied across the series capacitor Cr, the voltage is clamped or short-circuited, so that expansion of failure due to breakdown of the series capacitor Cr can be prevented.

Next, a switching power supply apparatus according to a third preferred embodiment will be described with reference to FIGS. 5 and 6.

A step-up converter scheme is used in the first and second preferred embodiments, but a step-down converter scheme or a step-up/step-down converter scheme may be adopted. FIG. 5 shows an example where the step-down converter scheme is adopted and FIG. 6 shows an example where the step-up/step-down converter scheme is adopted. In FIGS. 5 and 6, the capacitors and diodes connected in parallel with the first and second switching elements Q1 and Q2 and the parasitic capacitor of the rectifier diode Ds are not shown. Also, the switching control circuit for applying a switching control signal to the gates of the first and second switching elements Q1 and Q2 is not shown.

Figure 5:
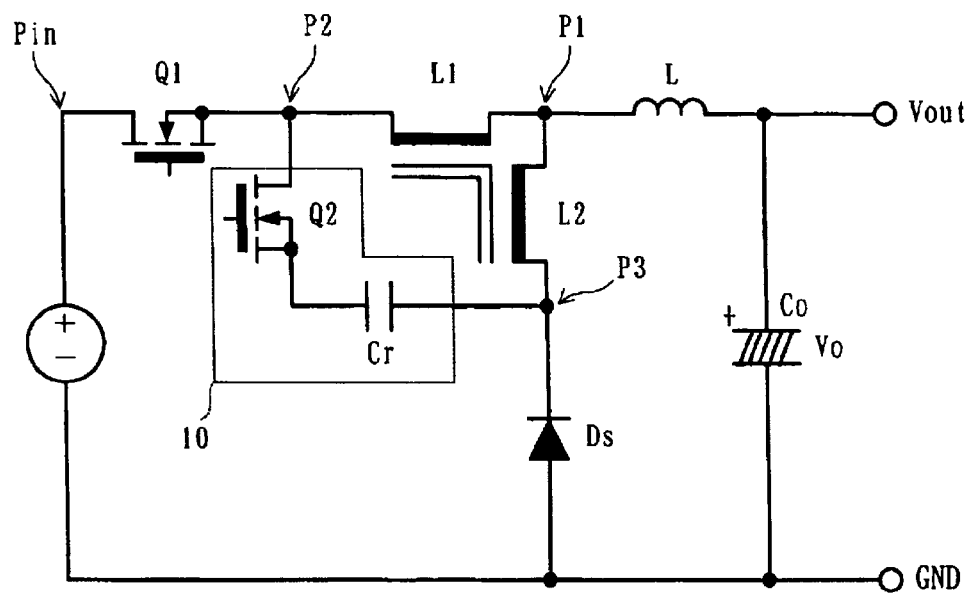
FIG. 5 is a circuit diagram of a switching power supply apparatus according to a third preferred embodiment of the present invention.

In FIG. 5, the first switching element Q1 is provided between the power supply input unit Pin and the second junction point P2, the rectifier diode Ds is provided between the third junction point P3 and a ground GND, and the inductor L is provided between the first junction point P1 and the output unit Vout.

Figure 6:
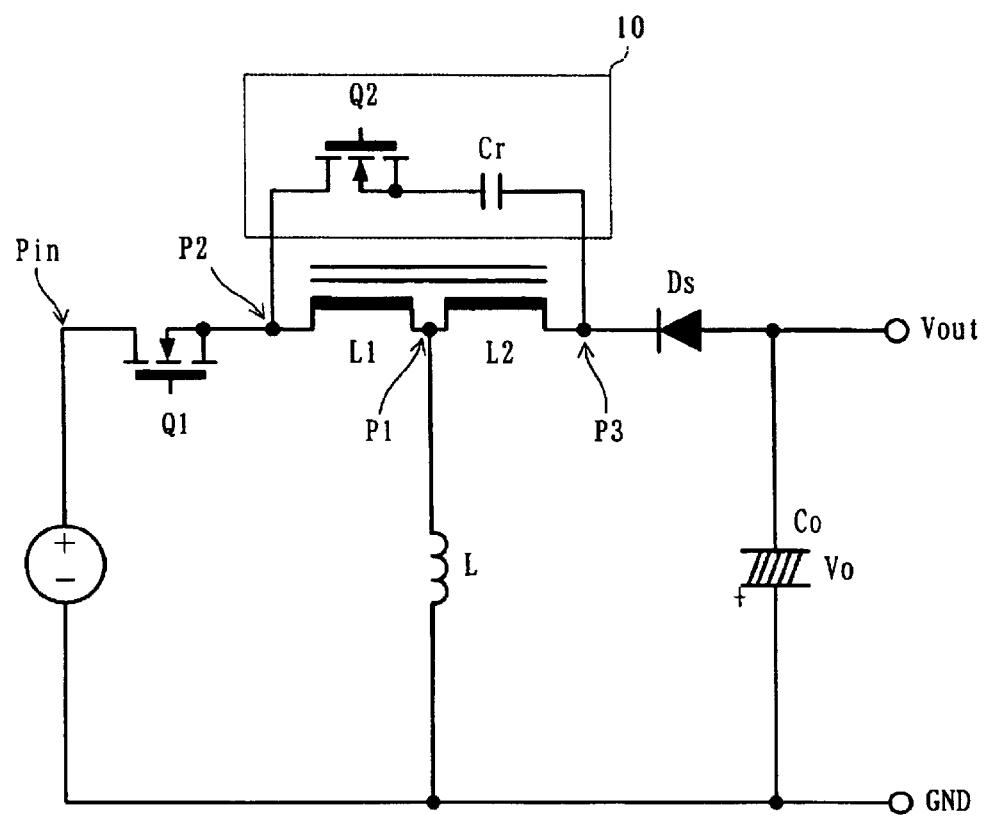
FIG. 6 is a circuit diagram of a switching power supply apparatus according to the third preferred embodiment of the present invention.

In FIG. 6, the first switching element Q1 is provided between the power supply input unit Pin and the second junction point P2, the inductor L is provided between the first junction point P1 and the ground GND, and the rectifier diode Ds is provided between the third junction point P3 and the output unit Vout.

In both FIGS. 5 and 6, the first commutation inductor L1 is provided in a path of current flowing through the first switching element Q1 and the inductor L during the ON period of the first switching element Q1, and the second commutation inductor L2 is provided in a path of current flowing through the inductor L during the OFF period of the first switching element Q1. Also, the clamping series circuit 10, which includes the second switching circuit having the second switching element Q2 and the series capacitor Cr connected in series, is provided, and the clamping series circuit 10 is connected to the second and third junction points P2 and P3 so that the first and second commutation inductors L1 and L2 and the series capacitor Cr constitute a resonance circuit. Further, the clamping series circuit 10 is connected in parallel to the series circuit including the first and second commutation inductors L1 and L2. This configuration is the same as that of the step-up converter shown in FIGS. 1 and 4.

With this configuration, zero-voltage switching of the first and second switching elements Q1 and Q2 can be performed, and a wider range of voltages input to the power supply input unit Pin can be output as a stable DC voltage.

Next, a switching power supply apparatus according to a fourth preferred embodiment will be described with reference to FIGS. 7A to 10B.

Figure 7A:
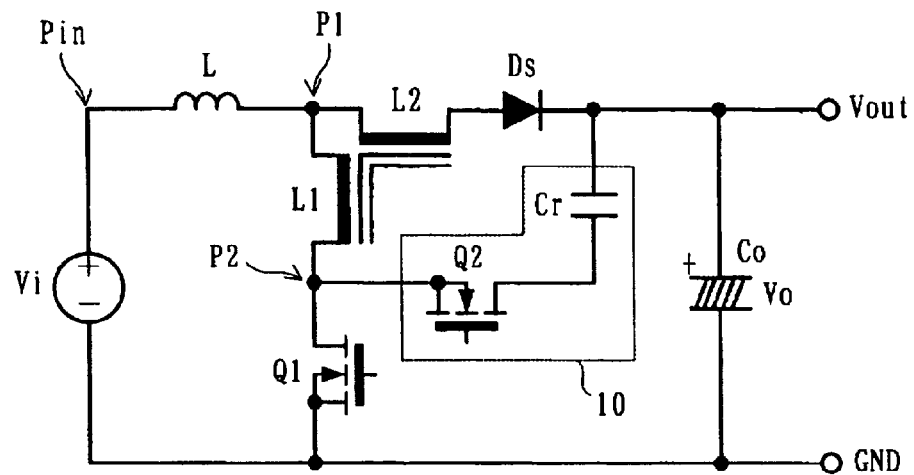
FIGS. 7A to 7C are circuit diagrams, each showing a critical portion of a switching power supply apparatus according to a fourth preferred embodiment of the present invention.
Figure 7B:
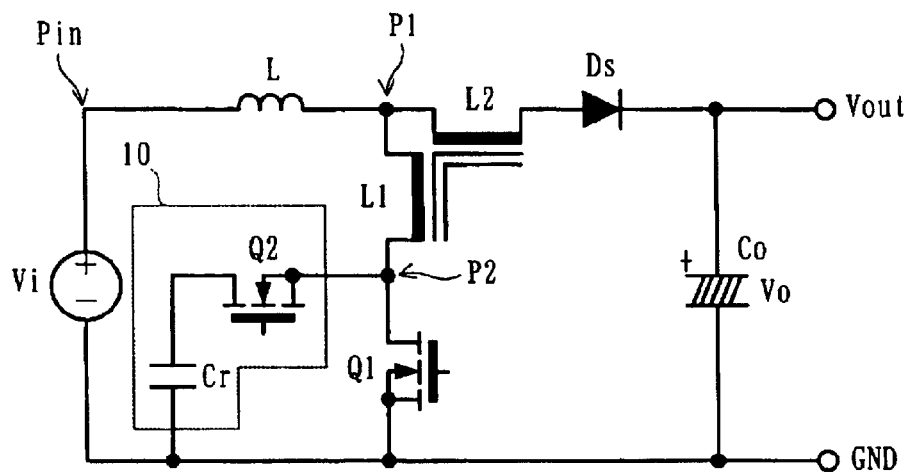
Figure 7C:
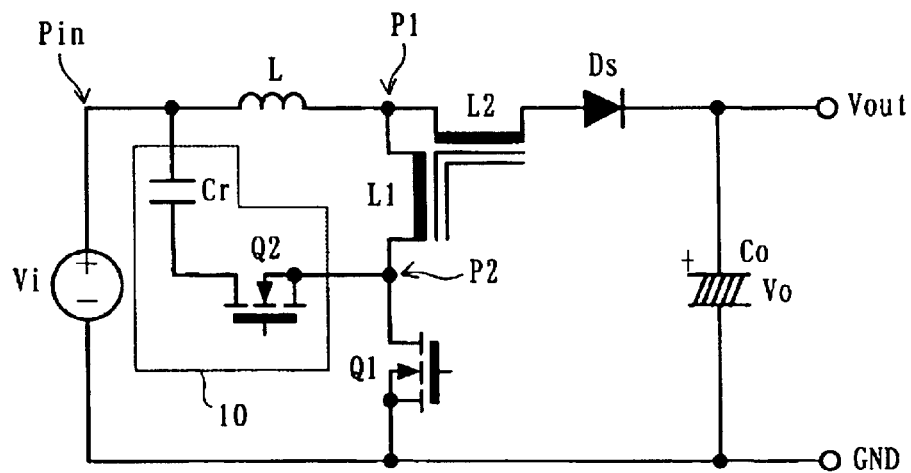
Figure 8A:
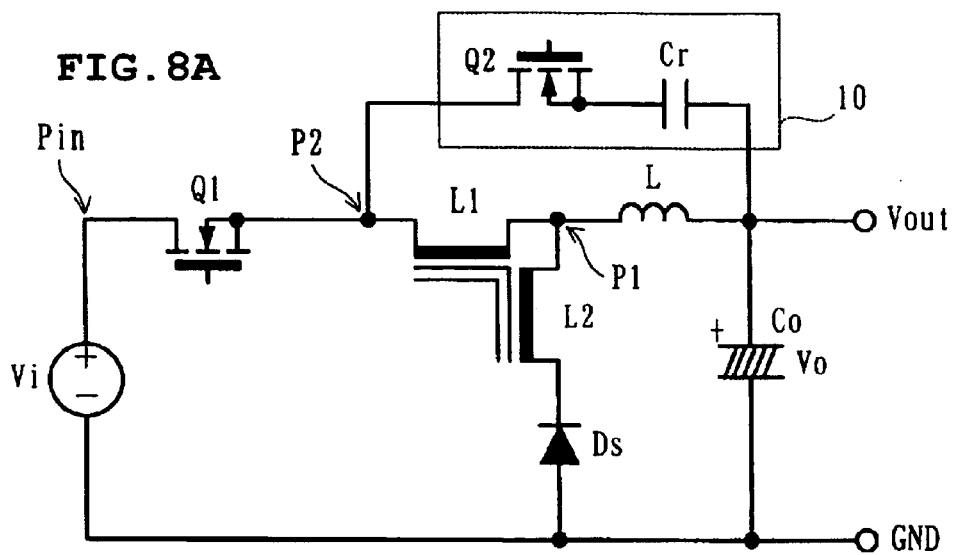
FIGS. 8A to 8C are circuit diagrams, each showing a critical portion of a switching power supply apparatus according to the fourth preferred embodiment of the present invention.
Figure 8B:
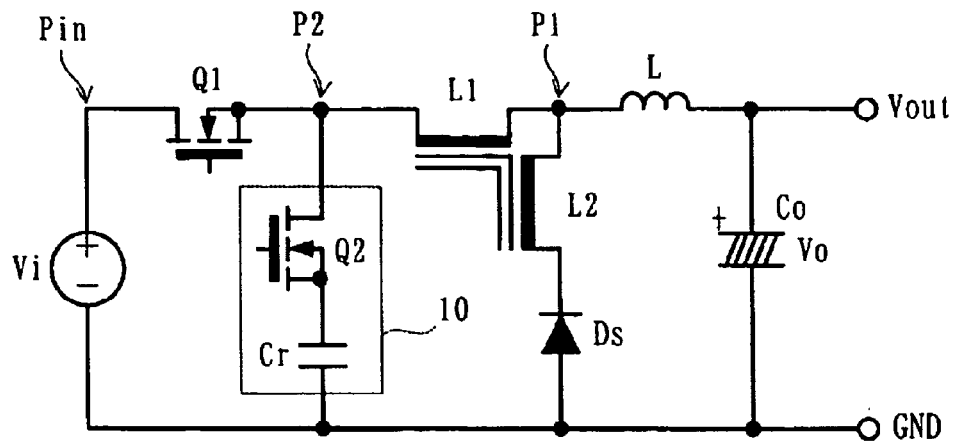
Figure 8C:
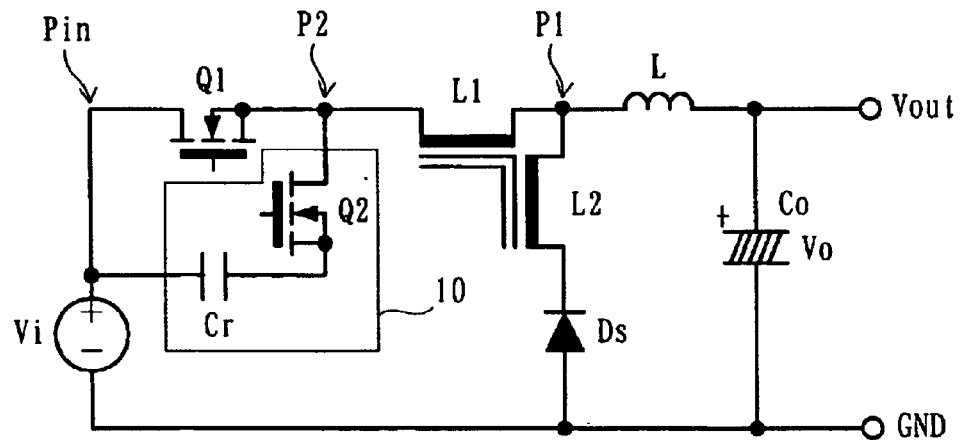
Figure 9A:
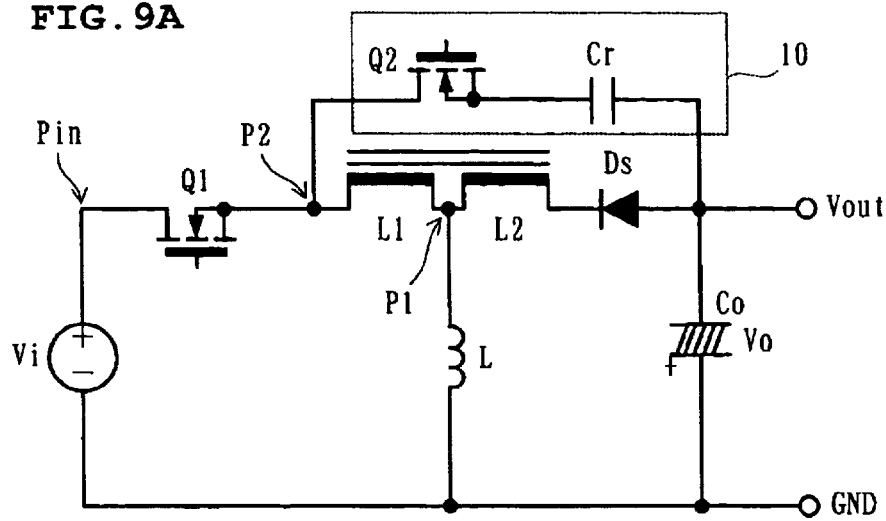
FIGS. 9A to 9C are circuit diagrams, each showing a critical portion of a switching power supply apparatus according to the fourth preferred embodiment of the present invention.
Figure 9B:
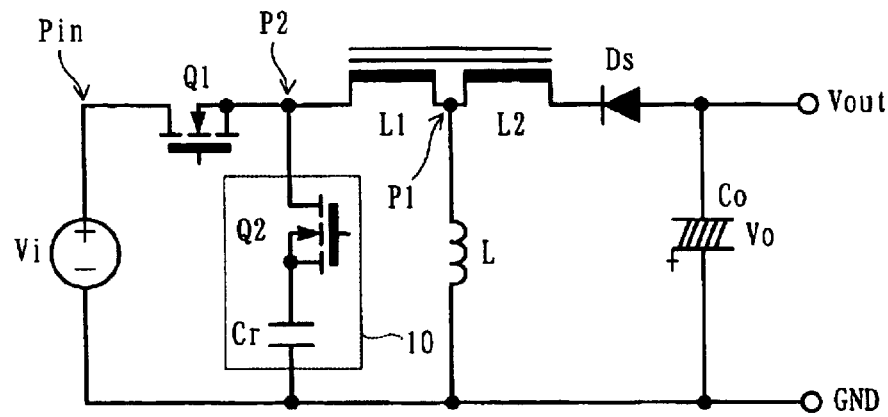
Figure 9C:
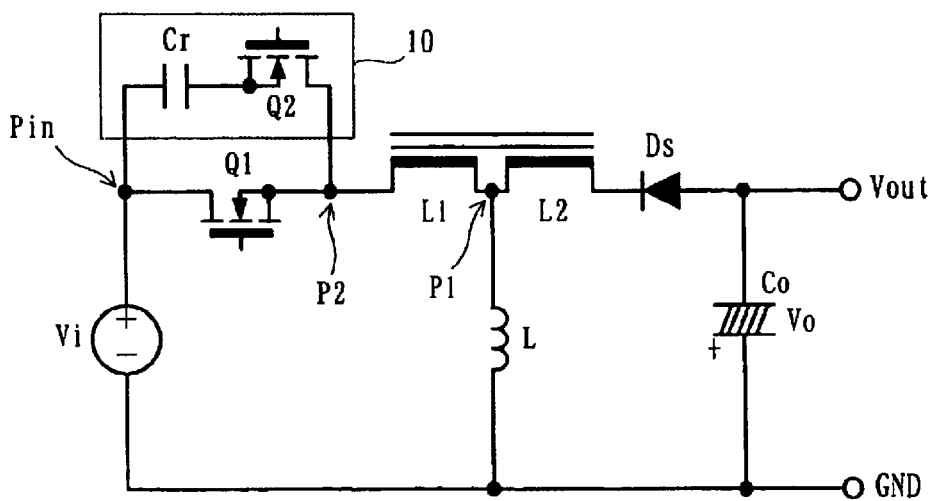

FIGS. 7A to 7C show three types of configuration of a step-up converter. FIGS. 8A to 8C show three types of configuration of a step-down converter. FIGS. 9A to 9C show three types of configuration of a step-up/step-down converter.

In FIGS. 7A to 9C, Vi is an input power supply corresponding to a circuit in the power supply input side from the power supply input unit Pin. In FIGS. 7A to 9C, the capacitors and diodes connected in parallel to the first and second switching elements Q1 and Q2 and the parasitic capacitor of the rectifier diode Ds are not shown. Also, the switching control circuit for applying a switching control signal to the gates of the first and second switching elements Q1 and Q2 is not shown.

In each of FIGS. 7A to 9C, the first commutation inductor L1 is provided in a path of current flowing from the power supply input unit Pin through the first switching element Q1 and the inductor L during the ON period of the first switching element Q1, and the second commutation inductor L2 is provided in a path of current flowing through the first commutation inductor L1 during the OFF period of the first switching element Q1. Also, the inductor L and the first and second commutation inductors L1 and L2 are connected the first junction point P1, and the clamping series circuit 10 including the second switching element Q2 and the series capacitor Cr connected in series is provided. Further, one end of the clamping series circuit 10 is connected to the second junction point P2, which connects the first commutation inductor L1 and the first switching element Q1, so that the first and second commutation inductors L1 and L2 and the series capacitor Cr constitute a resonance circuit.

In FIGS. 7A, 8A, and 9A, the other end of the clamping series circuit 10 is connected to the output unit Vout. In FIGS. 7B, 8B, and 9B, the other end of the clamping series circuit 10 is connected to the ground GND. In FIGS. 7C, 8C, and 9C, the other end of the clamping series circuit 10 is connected to the power supply input unit Pin.

In FIGS. 7A to 9C, a resonance current in the resonance circuit including the first and second commutation inductors L1 and L2 and the series capacitor Cr flows through the following path.

In each of the circuits shown in FIGS. 1, 4, 5, and 6, both ends of the clamping series circuit 10 are connected to the second and third junction points P2 and P3, and the third junction point P3 defines as a junction point of the second commutation inductor L2 and the rectifier diode Ds. With this configuration, the mode shifts from a continuous mode to a so-called discontinuous mode under a light-load condition. On the other hand, in the switching power supply apparatuses shown in FIGS. 7A to 9C, one end of the clamping series circuit 10 is connected to the second junction point P2 and the other end thereof is connected to any of the power supply input unit Pin, the output unit Vout, and the ground GND. With this configuration, the mode shifts to a so-called regenerative mode under a light-load condition.

Figure 10A:
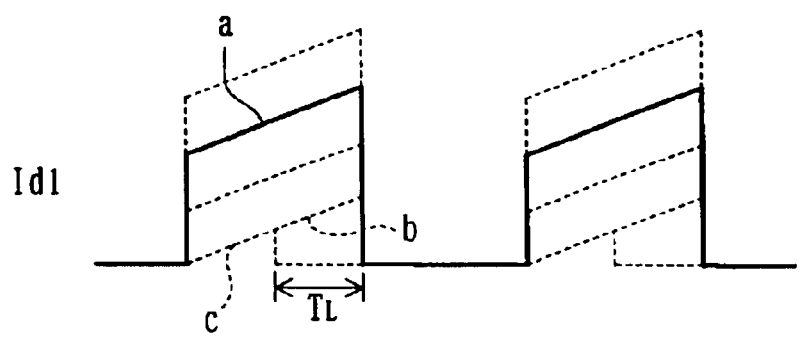
FIGS. 10A and 10B show waveforms of a drain current of a first switching element Q1 when the mode shifts to a discontinuous mode and a regenerative mode under a light-load condition.
Figure 10B:
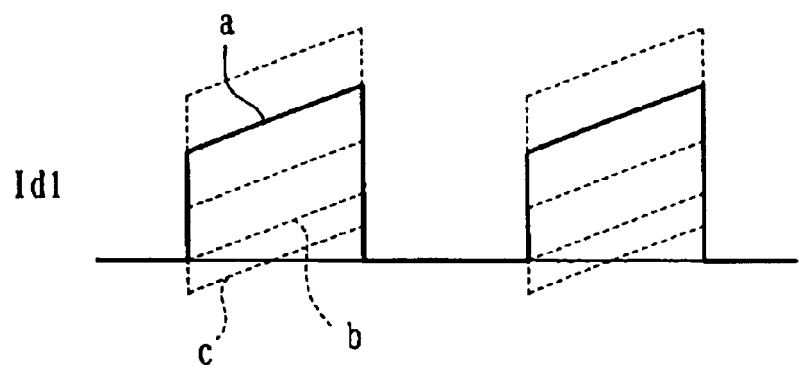
Figure 11:
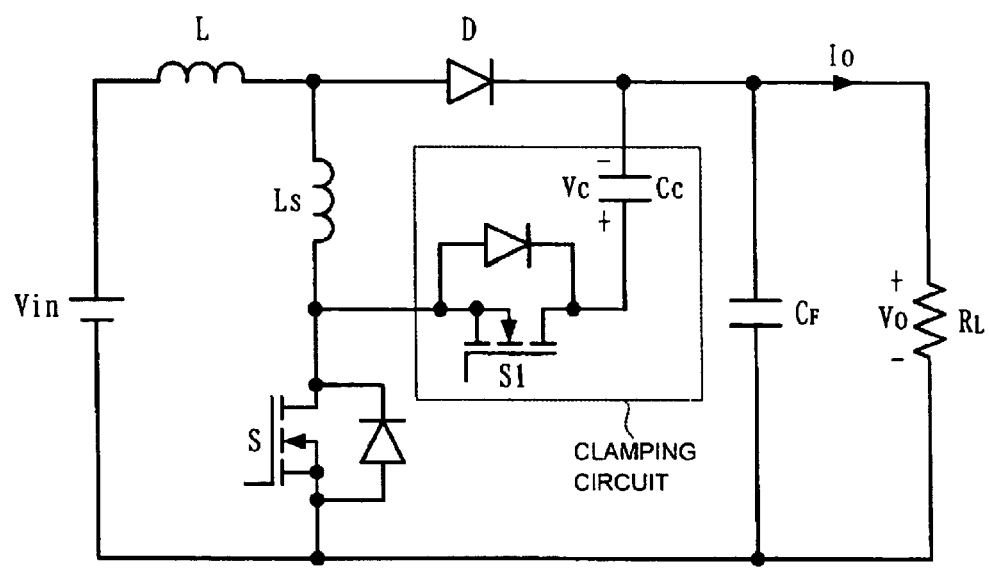
FIG. 11 is a circuit diagram of a known switching power supply apparatus.
Figure 12:
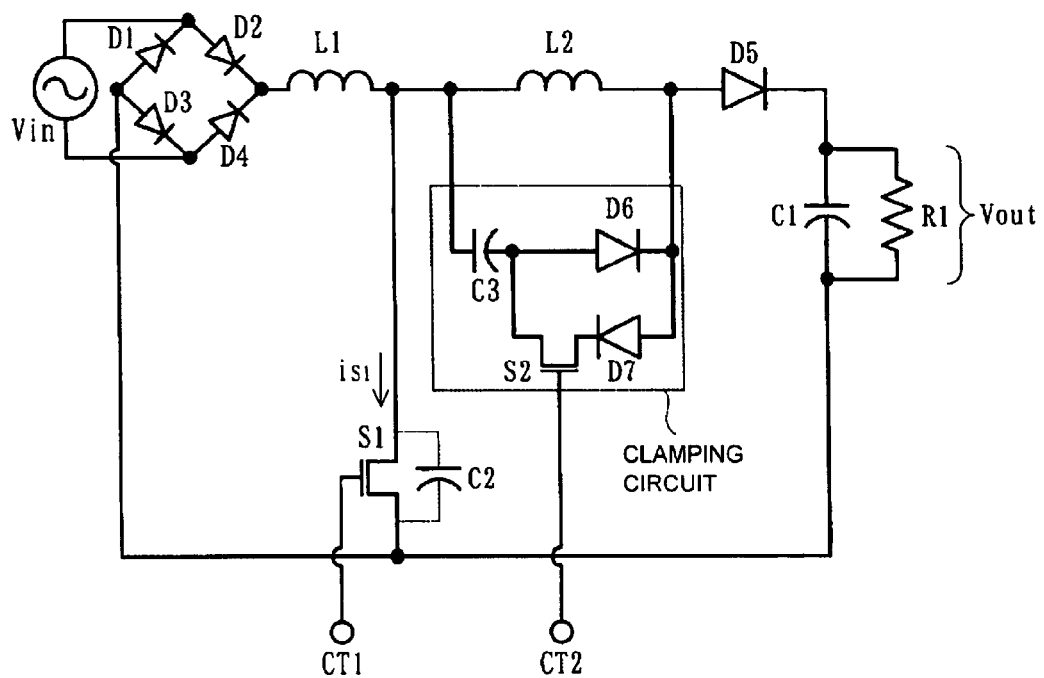
FIG. 12 is a circuit diagram of another known switching power supply apparatus.

FIGS. 10A and 10B show that state. FIG. 10A shows the waveform of the drain current Id1 of the first switching element Q1 when the mode shifts to the discontinuous mode and FIG. 10B shows the waveform of the drain current Id1 of the first switching element Q1 when the mode shifts to the regenerative mode. When the input and output voltages are constant, the drain current Id1 of the first switching element Q1 increases as the output current increases.

In FIGS. 10A and 10B, a is the drain current of the first switching element Q1 under a certain load. As the load becomes lighter and the drain current Id1 becomes smaller, the height of the waveform of Id1 becomes shorter while its inclination remains constant. In a switching power supply apparatus for shifting to the discontinuous mode, when the output power further reduces from a state shown by b (critical mode), the first switching element Q1 is turned off during the ON period of the first switching element Q1 so as to shift to the discontinuous mode, as shown by c. That is, period TL, when the current flowing through the inductor L reaches 0, is generated.

On the other hand, in a switching power supply apparatus for shifting to the regenerative mode, when the load becomes lighter than in the critical mode b, the mode shifts to the regenerative mode, where the current Id1 starts from a negative level, as shown in FIG. 10B. As a result, a current continues to flow through the inductor L even under a light-load condition.

In the discontinuous mode, conduction loss in the inductor L and the first commutation inductor L1 can be suppressed and loss in the switching power supply apparatus under a light-load condition can be reduced. On the other hand, in the regenerative mode, a predetermined current flows through the inductor L even under a light-load condition, and thus stability of the output voltage and a response characteristic to an output variation can be improved.

Figure 4:
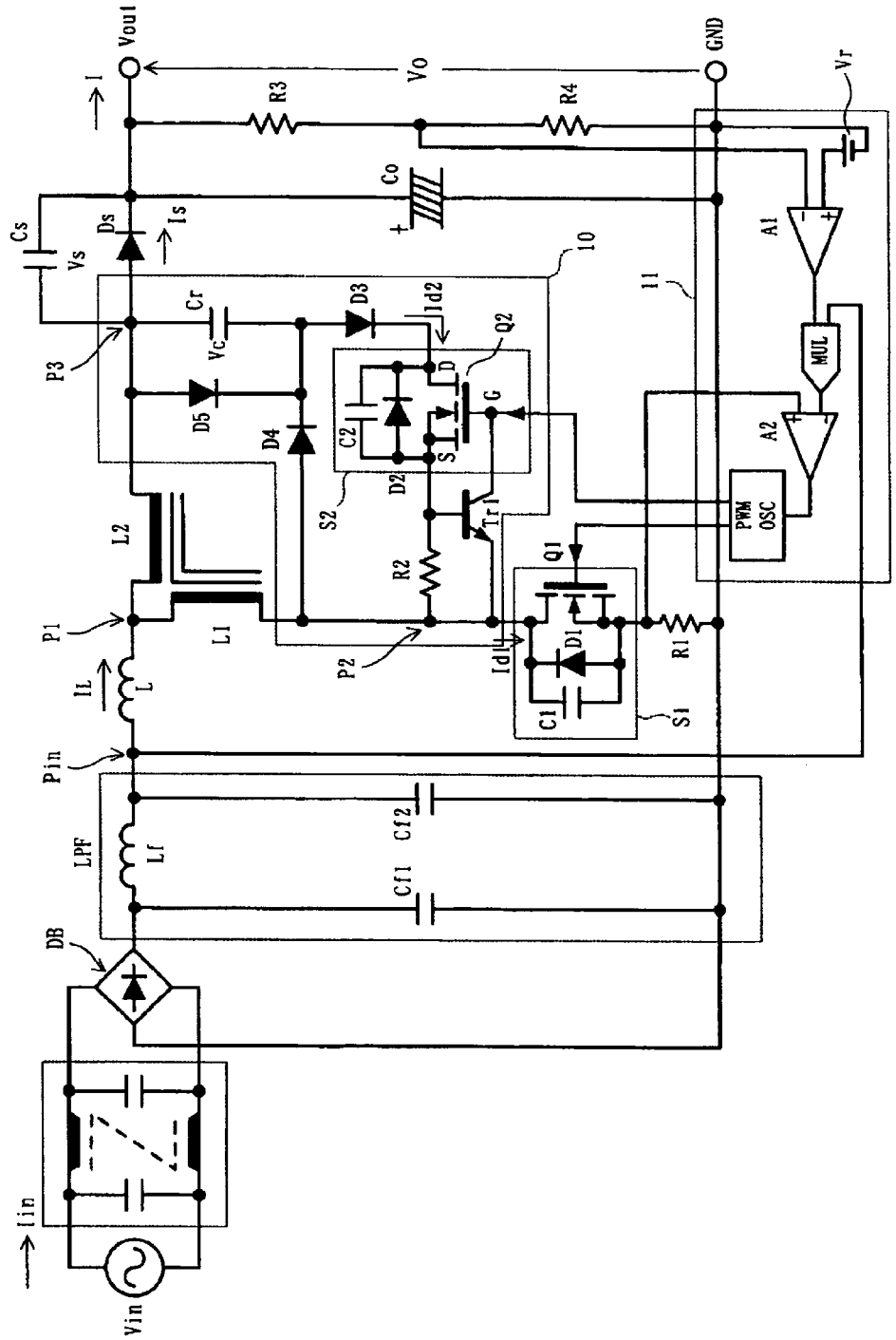
FIG. 4 is a circuit diagram of a switching power supply apparatus according to a second preferred embodiment of the present invention.

In the preferred embodiments shown in FIGS. 1 and 4, the low-pass filter LPF is provided between the diode bridge DB and the power supply input unit Pin. Alternatively, the low-pass filter LPF may be provided in the input side of the diode bridge DB for performing full-wave rectification. In that case, a pulse current generated by a switching operation flows through the diode bridge DB. Since the diode bridge DB has a filter effect, the low-pass filter LPF can be advantageously miniaturized.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A switching power supply apparatus comprising:
   a first switching circuit for supplying and interrupting power from a power supply input unit;
   an inductor for accumulating the power input through the first switching circuit and discharging the power to a power supply output unit;
   a rectifier diode for rectifying a current flowing to the output unit; and
   a smoothing capacitor for smoothing a voltage of the output unit; wherein
   a first commutation inductor is provided in a path of current flowing from the power supply input unit through the first switching circuit and the inductor during an ON period of the first switching circuit;
   a second commutation inductor is provided in a path of current flowing through the inductor during an OFF period of the first switching circuit;
   the inductor and the first and second commutation inductors are connected to a first junction point;
   a clamping series circuit including a second switching circuit and a series capacitor connected in series is provided, and one end of the clamping series circuit is connected to a second junction point, which connects the first commutation inductor and the first switching circuit, so that the first and second commutation inductors and the series capacitor constitute a resonance circuit;
   the first switching circuit includes a parallel circuit of a first switching element, a first diode, and a first capacitor;
   the second switching circuit includes a parallel circuit of a second switching element, a second diode, and a second capacitor; and
   a switching control circuit for alternately turning on/off the first and second switching elements in a period when both switching elements are off therebetween is provided.

2. A switching power supply apparatus according to claim 1, wherein the clamping series circuit is connected in parallel to a series circuit of the first and second commutation inductors.

3. A switching power supply apparatus according to claim 1, wherein one end of the clamping series circuit including the second switching circuit and the series capacitor connected in series is connected to the second junction point, and the other end of the clamping series circuit is connected to at least one of the power supply input unit, the power supply output unit, and the ground.

4. A switching power supply apparatus according to claim 1, wherein the first and second commutation inductors are magnetically coupled.

5. A switching power supply apparatus according to claim 1, wherein an overcurrent protective circuit for detecting a current flowing through the second switching element, turning off the second switching element when the current reaches a predetermined value so as to suppress a peak of the current flowing through the second switching element, and suppressing magnetic saturation of the first and second commutation inductors is connected in series with the second switching element.

6. A switching power supply apparatus according to claim 5, wherein a third diode having a shorter reverse recovery time than that of the second switching element and preventing a reverse current to the second switching element is provided in the clamping series circuit, and a fourth diode is connected in parallel to a series circuit including the second switching circuit, in a direction opposite to a conduction direction of the second switching element.

7. A switching power supply apparatus according to claim 1, wherein a third diode is connected in parallel to the series capacitor, in a direction for preventing application of a reverse voltage to the series capacitor.

8. A switching power supply apparatus according to claim 1, wherein a full-wave rectification circuit for performing full-wave rectification of input from a commercial AC power supply is provided, and a low-pass filter for allowing frequency components of the commercial AC power supply to pass therethrough and cutting off components of switching frequencies of the first and second switching elements and their harmonic contents is provided between the full-wave rectification circuit and the power supply input unit.

9. A switching power supply apparatus according to claim 1, wherein the switching control circuit includes a unit for multiplying a voltage proportional to a full-wave rectification voltage signal obtained by rectifying the commercial AC power supply voltage by a DC output voltage or a DC voltage obtained by dividing the output voltage so as to obtain a reference signal for a current error amplifier which controls both input current and output voltage, and controlling the pulse width of a control signal for the first and second switching elements based on the reference signal.

10. A switching power supply apparatus according to claim 1, wherein at least one of the first and second switching circuits is a field-effect transistor.

11. A switching power supply apparatus according to claim 1, wherein the switching control circuit includes timing control unit for turning on the first or second switching element after a voltage applied across the first or second switching element drops to zero or nearly zero.

* * * * *